United States Patent
Wang (10) Patent No.: US 9,002,932 B2
(45) Date of Patent: Apr. 7, 2015

(54) CLOUD COMPUTING ACCESS GATEWAY AND METHOD FOR PROVIDING A USER TERMINAL ACCESS TO A CLOUD PROVIDER

(75) Inventor: Zhi Wang, Shanghai (CN)

(73) Assignee: Alcatel Lucent, Boulogne-Billancourt (FR)

(*) Notice: Subject to any disclaimer, the term of this patent is extended or adjusted under 35 U.S.C. 154(b) by 107 days.

(21) Appl. No.: 13/564,160

(22) Filed: Aug. 1, 2012

(65) Prior Publication Data

US 2013/0080509 A1   Mar. 28, 2013

(30) Foreign Application Priority Data

Sep. 27, 2011   (CN) .......................... 2011 1 0298208

(51) Int. Cl.
*G06F 15/16* (2006.01)
*H04L 12/66* (2006.01)
*H04L 29/08* (2006.01)

(52) U.S. Cl.
CPC ............ *H04L 12/66* (2013.01); *H04L 67/2814* (2013.01); *H04L 67/1002* (2013.01)

(58) Field of Classification Search
CPC .. H04L 12/66; H04L 67/2814; H04L 67/1002
USPC .................. 709/203, 223, 224, 217
See application file for complete search history.

(56) References Cited

U.S. PATENT DOCUMENTS

| | | | |
|---|---|---|---|
| 7,286,532 B1* | 10/2007 | Rachepalli et al. | 370/391 |
| 8,433,801 B1* | 4/2013 | Yemini et al. | 709/226 |
| 8,856,344 B2* | 10/2014 | Gould et al. | 709/226 |
| 2003/0128697 A1* | 7/2003 | Narain et al. | 370/352 |
| 2008/0031430 A1* | 2/2008 | Narain et al. | 379/88.17 |
| 2010/0027552 A1 | 2/2010 | Hill | |
| 2010/0235903 A1 | 9/2010 | Carter et al. | |
| 2010/0251329 A1* | 9/2010 | Wei | 726/1 |
| 2010/0318609 A1 | 12/2010 | Lahiri et al. | |
| 2010/0332262 A1 | 12/2010 | Horvitz et al. | |
| 2010/0333116 A1 | 12/2010 | Prahlad et al. | |
| 2011/0173108 A1* | 7/2011 | Rajasekar et al. | 705/34 |
| 2011/0173550 A1* | 7/2011 | Oetzel | 715/757 |
| 2012/0054259 A1* | 3/2012 | Peng | 709/202 |
| 2012/0059917 A1* | 3/2012 | Dawson et al. | 709/223 |
| 2012/0192263 A1* | 7/2012 | Lin et al. | 726/12 |
| 2012/0221690 A1* | 8/2012 | Beaty et al. | 709/221 |
| 2013/0069950 A1* | 3/2013 | Adam et al. | 345/440 |
| 2013/0212160 A1* | 8/2013 | Lawson et al. | 709/203 |
| 2013/0212214 A1* | 8/2013 | Lawson et al. | 709/217 |

* cited by examiner

*Primary Examiner* — Kostas Katsikis
(74) *Attorney, Agent, or Firm* — Harness, Dickey & Pierce (57) ABSTRACT

A cloud computing access gateway includes a cloud management module configured to store a cloud provider and information of a cloud computing service provided by the cloud provider. A user terminal interface module is configured to provide an interface with a user terminal, receive a service request indicating a cloud computing service from the user terminal, and send a result of the cloud computing service to the user terminal. A request analysis module is configured to analyze the received service request to identify the cloud computing service. A cloud selection module is configured to select a best cloud provider based on the cloud computing service. A cloud interface module is configured to provide an interface with the cloud provider, transmit the service request to the best cloud provider, and receive the result of the cloud computing service from the best cloud provider.

10 Claims, 10 Drawing Sheets

CLOUD COMPUTING ACCESS GATEWAY AND METHOD FOR PROVIDING A USER TERMINAL ACCESS TO A CLOUD PROVIDER

FIELD OF THE INVENTION

The present invention relates to cloud computing technology, particularly to a cloud computing access gateway and a method for providing a user terminal access to a cloud provider.

BACKGROUND OF THE INVENTION

At present, cloud computing is developing rapidly. Cloud computing is an Internet-based computing mode, by which shared software/hardware resources and information can be provided to user terminals as required. A network that provides the corresponding resources is named as "cloud". Users can utilize the user terminals such as desktop or laptop computers, mobile phones, etc., to obtain the services in a pay-as-you-go manner by accessing a data center of the cloud.

Generally, the cloud computing is considered to comprise the following levels of services: Infrastructure as a Service (IaaS), Platform as a Service (PaaS) and Software as a Service (SaaS). The cloud computing service often provides a general on-line commercial application accessible via a browser, and corresponding software and data may be stored in a data center.

Currently, some cloud providers build their clouds to provide the cloud computing services, for example, GOOGLE®, MICROSOFT®, AMAZON®, IBM®, SALESFORCE.COM®, CLARIZEN.COM®, etc.

However, there exist the following problems in the existing modes of the cloud computing:

1) Different cloud providers provide different user interface definitions, and the user terminal can only request for the cloud computing service from the cloud provider in conformity with the user interface definition of the user terminal. For example, if the cloud provider provides only web interface, a legacy PSTN phone terminal cannot access the cloud computing service.

2) The user is required to specify the cloud provider directly, thus the cloud computing service is not accessible transparently and automatically.

3) The cloud computer service is not always accessible anytime and from anywhere due to limitation of capability of the user terminal.

Thus, a cloud computing access gateway is expected, which can support the user terminal to access the cloud provider anytime and from anywhere. Moreover, for the user of the user terminal, it is not necessary to specify the cloud provider or take the interface definition adopted by the cloud provider into account.

Some technical solutions about cloud computing gateways, broker methods and systems, etc., have been presented so far. For example, the US patent application No. 2010/0027552A1 "Cloud computing gateway, cloud computing hypervisor, and methods for implementing same", US patent application No. 2010/0333116A1 "Cloud gateway system for managing data storage to cloud storage sites", US patent application No. 2010/0318609A1 "Bridging enterprise networks into cloud", US patent application No. 2010/0235903A1 "System and method for transparent cloud access", US patent application No. 2010/0332262A1 "Cloud computing resource broker". But all these solutions focus on the area of PaaS or Iaas of the cloud computing, that is, how to build a cloud middleware to meet different demands of applications on the clouds, and these solutions do not relate to supporting the user to access the cloud computing service anytime and from anywhere.

Therefore, the prior art is still lack of the technique to support the user terminal of the cloud computing service to access the cloud computing service anytime and from anywhere.

SUMMARY OF THE INVENTION

The present invention is presented in view of the above technical problems, and its object is to provide a cloud computing access gateway and a method for providing a user terminal access to a cloud provider, which enable the user terminal to access the cloud computing service anytime and from anywhere.

According to an aspect of the present invention, there is provided a cloud computing access gateway, which comprises: cloud management module that stores a cloud provider and information of a cloud computing service provided by the cloud provider; user terminal interface module that provides an interface with a user terminal, receives a service request indicating a cloud computing service from the user terminal, and sends a result of the cloud computing service to the user terminal; request analysis module that analyzes the received service request to identify the cloud computing service; cloud selection module that selects a best cloud provider based on the cloud computing service; and cloud interface module that provides an interface with the cloud provider, transmits the service request to the best cloud provider, and receives the result of the cloud computing service from the best cloud provider.

According to another aspect of the present invention, there is provided a method for providing a user terminal access to a cloud provider, which comprises: receiving a service request from the user terminal, wherein the service request indicates a cloud computing service; analyzing the service request to identify the cloud computing service; selecting a best cloud provider based on the cloud computing service; transmitting the service request to the best cloud provider; receiving a result of the cloud computing service from the best cloud provider; and sending the result of the cloud computing service to the user terminal.

DETAILED DESCRIPTION OF THE PREFERRED EMBODIMENTS

It is believed that the above and other objects, features and advantages of the invention will become more apparent from the following detailed description of the preferred embodiments of the invention taken in conjunction with accompany drawings.

Figure 1:
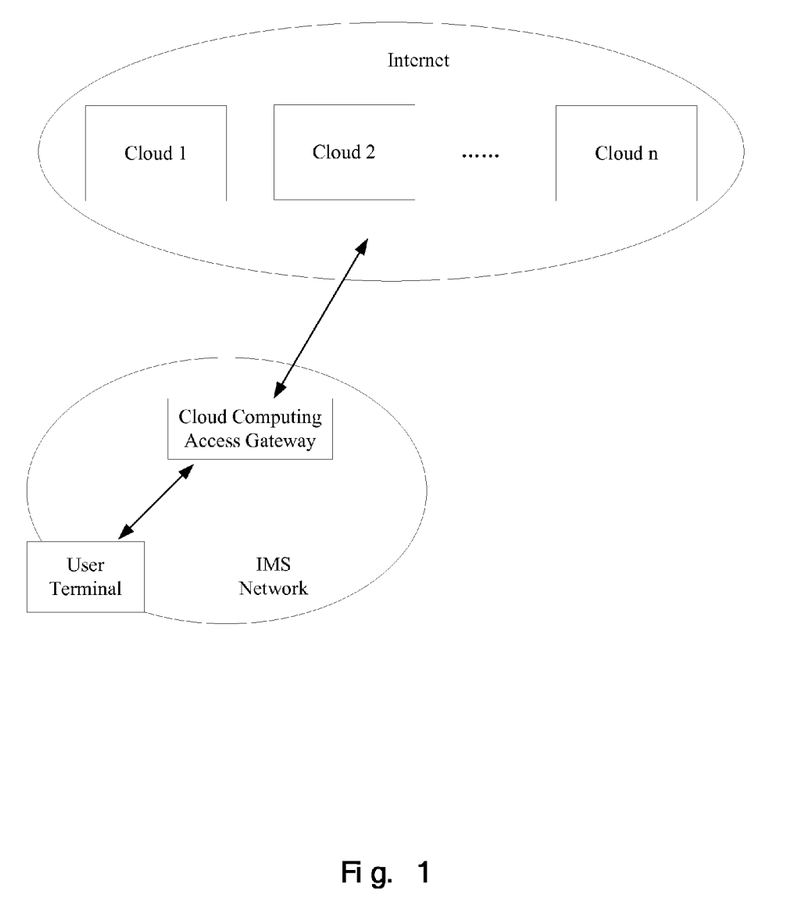
FIG. 1 is a schematic diagram of an applicable example of the cloud computing access gateway according to an embodiment of the present invention.

FIG. 1 shows a schematic diagram of an applicable example of the cloud computing access gateway according to an embodiment of the present invention. In the applicable example, the user terminal is an IP Multimedia Subsystem (IMS) terminal. As shown in FIG. 1, the cloud computing access gateway is located in the IMS system, and there are n clouds of the cloud providers on the Internet. The user terminal can access the cloud computing services provided by the n cloud providers via the cloud computing access gateway. Although in FIG. 1 the IMS system is illustrated as an example, a person skilled in the art will understand that the cloud computing access gateway can also be applied to any other types of communication networks.

Figure 2:
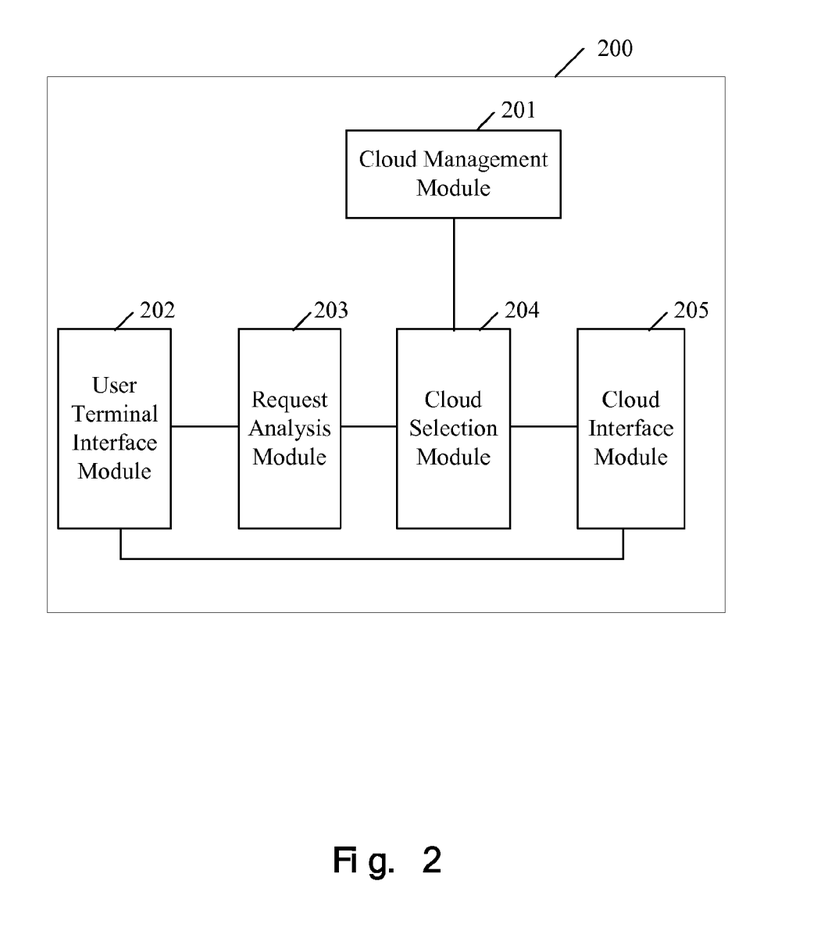
FIG. 2 is a schematic block diagram of the cloud computing access gateway according to the first embodiment of the present invention.

FIG. 2 shows a schematic block diagram of the cloud computing access gateway according to the first embodiment of the present invention. The embodiment will be described in detail below in conjunction with the figure.

As shown in FIG. 2, the cloud computing gateway 200 of the embodiment comprises cloud management module 201 which stores the cloud provider and information of the cloud computing service provided by the cloud provider; user terminal interface module 202 which provides an interface with a user terminal, receives a service request indicating a cloud computing service from the user terminal, and sends a result of the requested cloud computing service to the user terminal; request analysis module 203 which analyzes the received service request to identify the cloud computing service requested by the user terminal; cloud selection module 204 which selects a best cloud provider based on the identified cloud computing service; and cloud interface module 205 which provides an interface with the cloud provider, transmits the service request of the user terminal to the selected best cloud provider, and receives the result of the cloud computing service from the best cloud provider.

Usually, there are many cloud providers that provide various cloud computing services on the Internet. So the cloud management module 201 in the cloud computing access gateway 200 can store at least one cloud provider as well as the information of the cloud computing service provided by the cloud provider. The cloud management module 201 can obtain the cloud provider by means of an automatic discovery mechanism or in a predetermined manner, and store the cloud provider. Also, the information of the cloud computing service provided by the cloud provider, comprising a unique resource identifier (URI), an interface definition, a service type, quality of service and cost, etc., can be stored in the cloud management module 201, such that the cloud selection module 204 can subsequently use the information to select the best cloud provider. Of course, a person skilled in the art will appreciate that the information of the cloud computing service may also comprise other information.

The user terminal interface module 202 can provide the interface with the user terminal. The user terminal may be any type of terminal equipment, such as a computer, a telephone, or any other intelligent devices capable of connecting with networks. The user terminal can also be located in any type of communication networks, such as the IMS network, the mobile communication network, the PSTN network, etc. The user terminal interface module 202 may be connected to various types of user terminals by providing the corresponding type of interface.

When a user wants to use a cloud computing, he utilizes his user terminal to send a service request, wherein the service request indicates the cloud computing service. The user terminal interface module 202 of the cloud computing access gateway 200 receives the service request. The service request may be in any form supported by the communication network where the user terminal is located. For example, in the IMS network, the service request may be in the form of voice call, message, web request, etc. Then, the user terminal interface module 202 provides the request analysis module 203 with the service request.

The request analysis module 203 analyzes the service request to identify the requested cloud computing service. Since the requested cloud computing service has been indicated in the service request, thus, the request analysis module 203 can identify the cloud computing service requested by the user. Then, the request analysis module 203 provides the identified cloud computing service to the cloud selection module 204.

The cloud selection module 204 selects the best cloud provider from the cloud management module 201 based on the identified cloud computing service. In one embodiment, the cloud selection module 204 can automatically select the best cloud provider. Specifically, in the cloud selection module 204, a search unit searches the cloud management module 201 for the cloud provider(s) which can provide the cloud computing service, and then a cloud determination unit determines the best cloud provider from the searched cloud provider(s) based on a configuration of the cloud computing service defined by the user. The configuration of the cloud computing service, which may be defined by the user through a service setup module described later, comprises at least one of desired quality of service, desired cost and a desired security level. Of course, a person skilled in the art will appreciate that the configuration of the cloud computing service may also comprise other contents.

In another embodiment, the cloud selection module 204 allows the user of the user terminal to select the best cloud provider. Specifically, in the cloud selection module 204, a search unit searches the cloud management module 201 for the cloud provider(s) which can provide the cloud computing service, and then a provision unit provides the user terminal with the searched cloud provider(s) so as to allow the user of the user terminal to select the best cloud provider. In this embodiment, the provision unit may provide the searched cloud provider(s) as well as the related information of the cloud computing service provided by the searched cloud provider(s), such as quality of service, cost, popularity and the like, in the form of a list. Of course, a person skilled in the art will appreciate that the searched cloud providers as well as the related information may be provided in other forms.

After the cloud selection module 204 selects the best cloud provider, the service request is transmitted to the best cloud provider via the cloud interface module 205, and the best cloud provider executes the cloud computing service based on the service request. Moreover, the cloud interface module 205 can provide interfaces with each cloud providers stored in the cloud management module 201. Since the different cloud providers provide different interfaces, thus, the cloud interface module 205 provides the different interfaces correspondingly.

Next, the cloud interface module 205 receives the result of the cloud computing service from the best cloud provider, and the user terminal interface module 202 sends the result in the form that is identical to the service request to the user terminal. For example, when the service request is in the form of a voice call, the result of the cloud computing service will be played to the user terminal in voice. When the service request is in the form of a web request, the result of the cloud computing service is sent to the user terminal in the form of a web response. Alternatively, the form that the result of the cloud computing service may be sent back is specified directly in the service request.

It can be seen from the above description that the cloud computing access gateway of this embodiment can connect the user terminal to the cloud provider, and facilitate the user terminal to access the cloud computing service provided by the cloud provider anytime and from anywhere. In addition, the cloud computing access gateway of this embodiment may automatically select the suitable cloud provider based on the user's demand, thus, for the user terminal, the cloud computing access gateway of this embodiment is equivalent to the cloud provider that provides the cloud computing service, and the user terminal can access the cloud computing service transparently.

Figure 3:
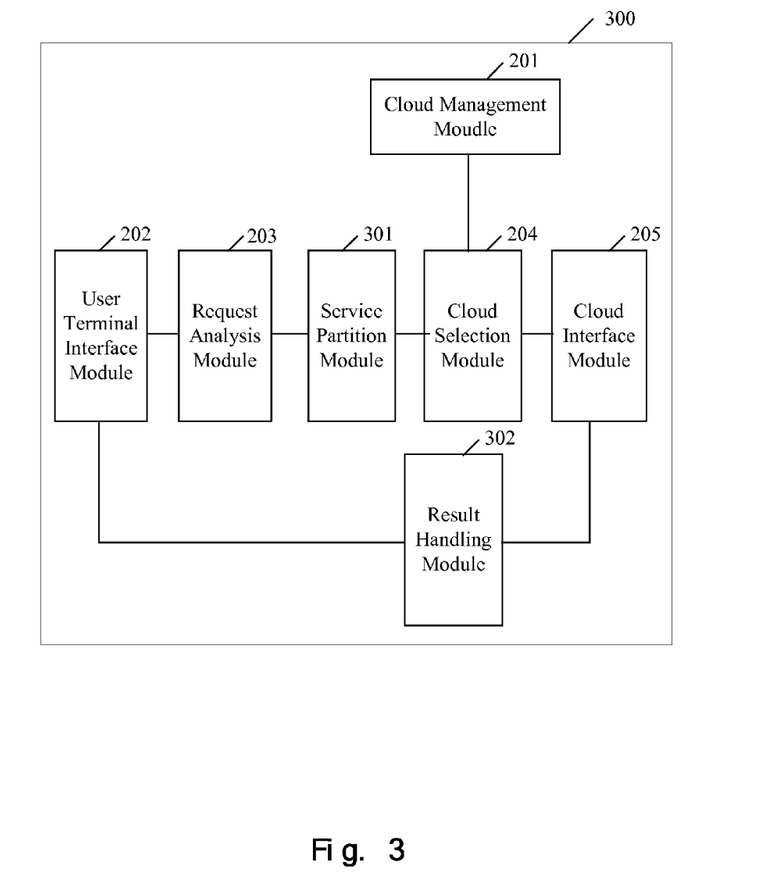
FIG. 3 is a schematic block diagram of the cloud computing access gateway according to the second embodiment of the present invention.

FIG. 3 shows a schematic block diagram of the cloud computing access gateway 300 according to the second embodiment of the present invention. This embodiment will be described in detail below in conjunction with the figure, and for the same part as that of the previous embodiment, the same reference number will be used and its description will be properly omitted.

Besides the modules of the cloud computing access gateway 200 shown in FIG. 2, the cloud computing access gateway 300 of this embodiment further comprises: service partition module 301 that partitions the identified cloud computing service into a plurality of sub-services; and a result handling module 302 that aggregates the results of the plurality of sub-services into an aggregated result of the cloud computing service.

In the cloud computing access gateway 300 of this embodiment, if the cloud computing service identified by the request analysis module 203 comprises multiple types of cloud computing services, the service partition module 301 will partition the identified cloud computing service into a plurality of sub-services. Then, the cloud selection module 204 selects the respective best cloud providers for each of the plurality of sub-services, and the service requests indicating the sub-services are respectively transmitted to the corresponding best cloud providers by the cloud interface module 205. After the completion of the respective sub-services by the best cloud providers corresponding to the respective sub-services, the cloud interface module 205 receives the results of the sub-services from the best cloud providers. Then the results of the sub-services are aggregated into an aggregated result of the cloud computing service by the result handling module 302 and the aggregated result is sent back to the user terminal via the user terminal interface module 202.

It can be seen from the above description that the cloud computing access gateway 300 of this embodiment can further subdivide the complicated cloud computing service, and provide the sub-services to the different cloud providers for execution.

Figure 4:
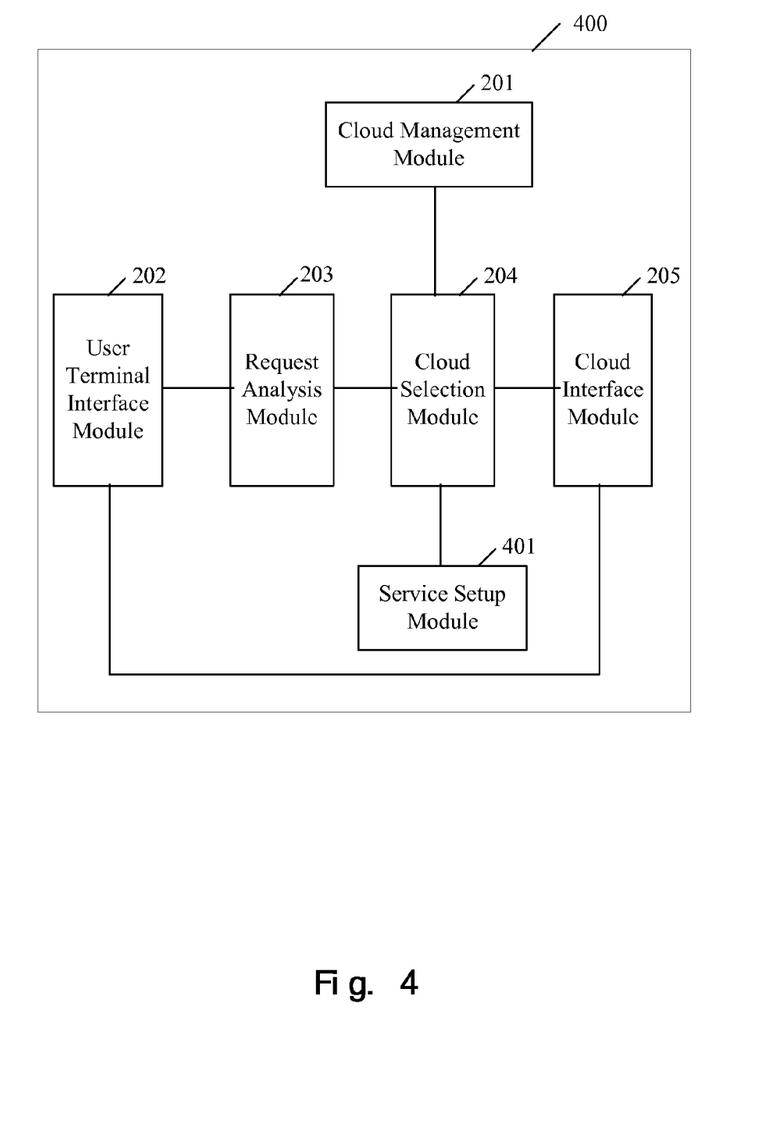
FIG. 4 is a schematic block diagram of the cloud computing access gateway according to the third embodiment of the present invention.

FIG. 4 shows a schematic block diagram of the cloud computing access gateway 400 according to the third embodiment of the present invention. This embodiment will be described in detail below in conjunction with the figure, and for the same part as that of the previous embodiments, the same reference number will be used and its description will be properly omitted.

Besides the modules of the cloud computing access gateway 200 shown in FIG. 2, the cloud computing access gateway 400 of this embodiment further comprises: service setup module 401, which allows the user of the user terminal to define a configuration of the cloud computing service.

In the cloud computing access gateway 400 of this embodiment, with the service setup module 401, the user can define and/or modify the configuration of the cloud computing service, including the desired quality of service, the desired cost and the desired security level, etc.

Further, the service setup module 401 can be configured to define the form that the result of the cloud computing service is returned. In this case, the result of the cloud computing service is sent to the user terminal in the form defined by the service setup module 401.

Further, the service setup module 401 can be configured to allow the user of the user terminal to define a shortcut key for the cloud computing service, and store the cloud computing service as well as the corresponding shortcut key. In this case, the user terminal interface module 202 receives a request containing the shortcut key from the user terminal, and the request analysis module 203 acquires the corresponding cloud computing service from the service setup module 401 based on the shortcut key.

In addition, the service setup module 401 may provide several access modes for the setup, such as voice, SMS, webpage, etc.

It can be seen from the above description that the cloud computing access gateway 400 of this embodiment enables the user to define and/or modify the configuration of the cloud computing service as well as define the shortcut key of the cloud computing service, thereby facilitating the use by the user.

Figure 5:
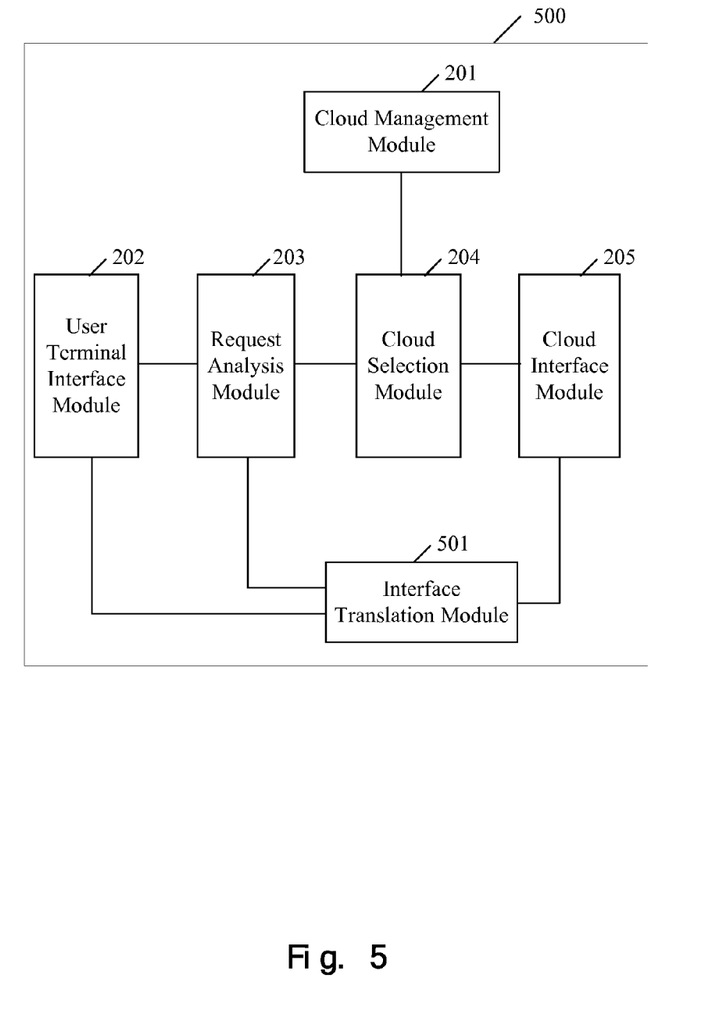
FIG. 5 is a schematic block diagram of the cloud computing access gateway according to the fourth embodiment of the present invention.

FIG. 5 shows a schematic block diagram of the cloud computing access gateway 500 according to the fourth embodiment of the present invention. This embodiment will be described in detail below in conjunction with the figure, and for the same part as that of the previous embodiments, the same reference number will be used and its description will be properly omitted.

Besides the modules of the cloud computing access gateway 200 shown in FIG. 2, the cloud computing access gateway 500 of this embodiment further comprises: interface translation module 501, which translates the service request from the user terminal into the service request in conformity with the interface definition of the selected best cloud provider and translates the result of the cloud computing service from the selected best cloud provider into the result of the cloud computing service in conformity with the interface definition of the user terminal, when the user terminal and the selected best cloud provider adopt the different interface definitions.

In this embodiment, after the cloud selection module 204 selects the best cloud provider based on the service request, if the user terminal and the selected best cloud provider adopt the different interface definitions, the interface translation module 501 performs the translation of the service request according to the interface definition of the best cloud provider, for example, performing an media translation, a protocol translation, etc., before the service request is transmitted to the best cloud provider via the cloud interface module 205. Then the cloud interface module 205 transmits the translated service request to the best cloud provider. After the cloud interface module 205 receives the result of the cloud computing service from the best cloud provider, the interface translation module 501 perform the translation of the result of the cloud computing service according to the interface definition of the user terminal, and sends the translated result back to the user terminal via the user terminal interface module 202.

For example, in the case that the user terminal adopts the interface definition of a voice call, while the cloud provider adopts the interface definition of a web request/response, the interface translation module 501 translates the service request in the form of the voice call into a web request, and translates the result of the cloud computing service in the form of the web response into a voice, and provides the voice to the user terminal.

It can be seen from the above description that the cloud computing access gateway 500 of this embodiment can serve as an interface adapter for providing the interface translation between the user terminal and the cloud provider that adopt the different interface definitions.

Figure 6:
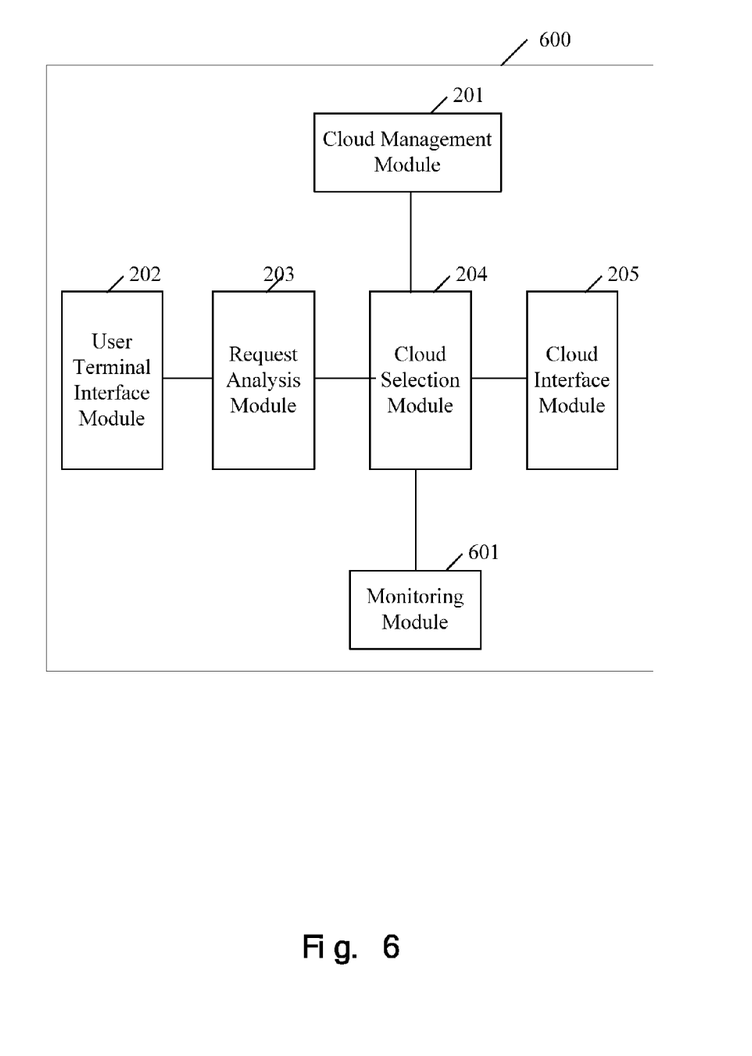
FIG. 6 is a schematic block diagram of the cloud computing access gateway according to the fifth embodiment of the present invention.

FIG. 6 shows a schematic block diagram of the cloud computing access gateway 600 according to the fifth embodiment of the present invention. This embodiment will be described in detail below in conjunction with the figure, and for the same part as that of the previous embodiments, the same reference number will be used and its description will be properly omitted.

Besides the modules of the cloud computing access gateway 200 shown in FIG. 2, the cloud computing access gateway 600 of this embodiment further comprises: monitoring module 601 which monitors availability of the cloud provider, and informs the cloud selection module 204 of selecting another best cloud provider when it is monitored that the best cloud provider is unavailable.

In the cloud computing access gateway 600 of this embodiment, the monitoring module 601 monitors the availability of each cloud provider. If the monitoring module 601 monitors the unavailability of the best cloud provider when the best cloud provider is executing the cloud computing service, it informs the cloud selection module 204 of selecting another best cloud provider of the cloud computing service to execute the cloud computing service.

Further, the monitoring module 601 can be configured to evaluate the cloud computing service of the cloud provider based on a response time for the service request, stability of the cloud computing service, relevance and preciseness of the result of the cloud computing service, etc., and store the result of the evaluation as one of the bases for selecting the best cloud provider by the cloud selection module 204.

It can be seen from the above description that the cloud computing access gateway 600 of this embodiment can monitor the availability of the cloud provider, and select another best provider when the current best cloud provider is unavailable, so as to provide the user with uninterrupted cloud computing service.

A person skilled in the art can understand that the modules of the cloud computing access gateways of the above embodiments can be combined with each other arbitrarily. For example, in another embodiment, the cloud computing access gateway may comprise all the modules of the above embodiments.

A simple example is described as follows to illustrate the application of the cloud computing access gateway according to the embodiments of the present invention.

In this example, the cloud computing service requested by the user is a navigation service, and the user defines the shortcut key for the navigation service.

When the user uses the user terminal to send the service request comprising the shortcut key for the navigation service in the form of the voice call, the cloud computing access gateway analyzes the service request and identifies the service requested by the user as the navigation service based on the shortcut key. Next, the cloud computing access gateway selects the best cloud provider, and sends the service request along with a source address and a destination address of the user terminal to the best cloud provider. Upon the receipt of the result of the navigation service, the cloud computing access gateway may play the result to the user in the same call session via voice or send it in the predetermined form to the user, e.g. SMS or Email.

Moreover, the cloud computing access gateway may also monitor the availability of the best cloud provider, and select and switch to another best cloud provider to perform the navigation service when the best cloud provider is unavailable.

It should be noted that the cloud computing access gateway of the above embodiments and respective components thereof may be implemented by hardware circuit such as large scale integrated circuit or gate arrays, semiconductors such as logic chip or transistors, or programmable hardware devices such as field programmable gate array, programmable logic device etc, or can be implemented by software executed by various types of processors, or can be implemented by a combination of the above hardware circuit and software.

Figure 7:
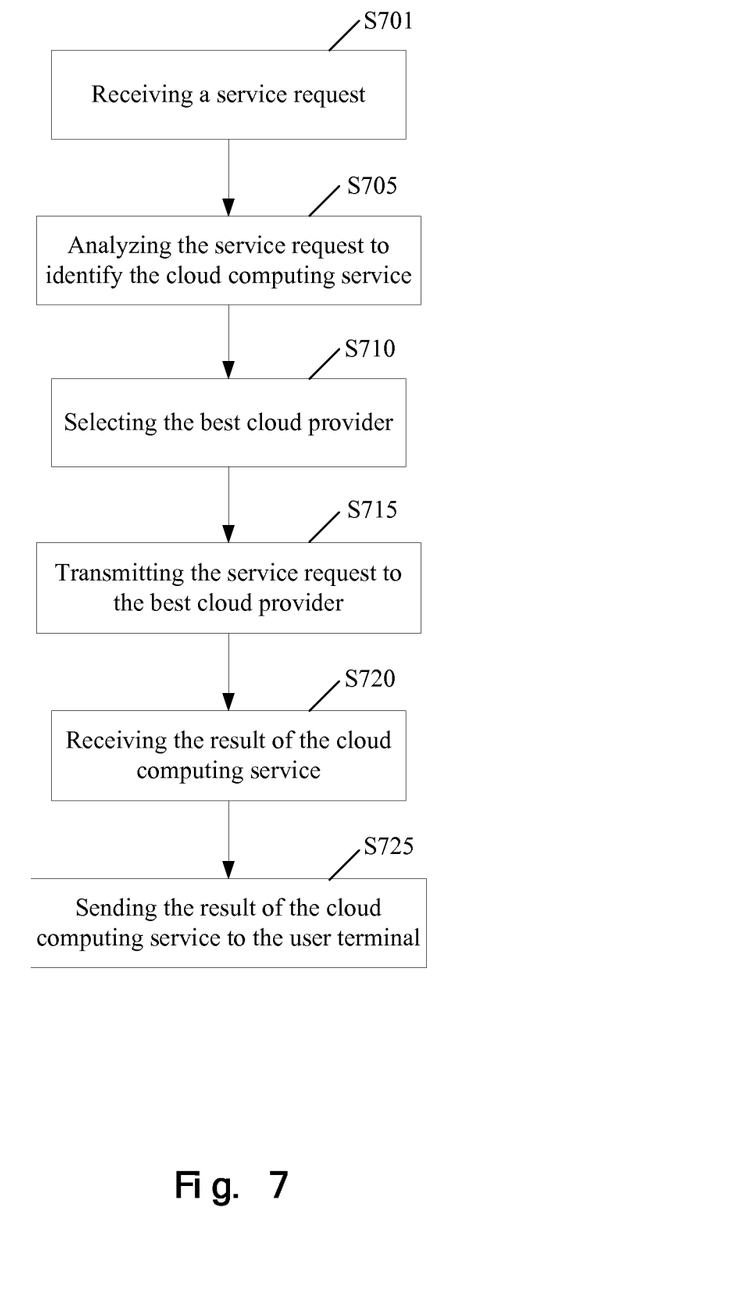
FIG. 7 is a flow chart of the method for providing a user terminal access to a cloud provider according to the first embodiment of the present invention.

Under the same inventive concept, FIG. 7 shows a flow chart of the method for providing a user terminal access to a cloud provider according to the first embodiment of the present invention. This embodiment will be described in detail below in conjunction with the figure, wherein for the same parts as those of the previous embodiments, the description will be properly omitted.

As shown in FIG. 7, at step S701, a service request from the user terminal is received. The service request indicates a cloud computing service. As mentioned above, the service request may adopt any form that can be supported by the communication network where the user terminal is located.

Next, at step S705, the service request is analyzed to identify the cloud computing service. Then, at step S710, the best cloud provider is selected based on the identified cloud computing service.

In one embodiment, the best cloud provider can be automatically selected. Specifically, firstly the cloud provider(s) which can provide the cloud computing service is searched, and then the best cloud provider is determined based on the configuration of the cloud computing service defined by the user of the user terminal. The configuration of the cloud computing service may comprise at least one of the desired quality of service, the desired cost and the desired security level.

In another embodiment, the best cloud provider can be selected by the user of the user terminal. Specifically, firstly the cloud provider(s) which can provide the cloud computing service is searched, and then the searched cloud providers are provided to the user terminal so as to allow the user of the user terminal to select the best cloud provider.

After selecting the best cloud provider, at step S715, the received service request is transmitted to the best cloud provider, and the best cloud provider can perform the cloud computing service in response to the service request. Then, at step S720, the result of the cloud computing service is received from the best cloud provider, and at step S725 the result of the cloud computing service is sent back to the user terminal.

It should be noted that the method for providing a user terminal access to a cloud provider of this embodiment can be performed by the cloud computing access gateway 200 as shown in FIG. 2.

Figure 8:
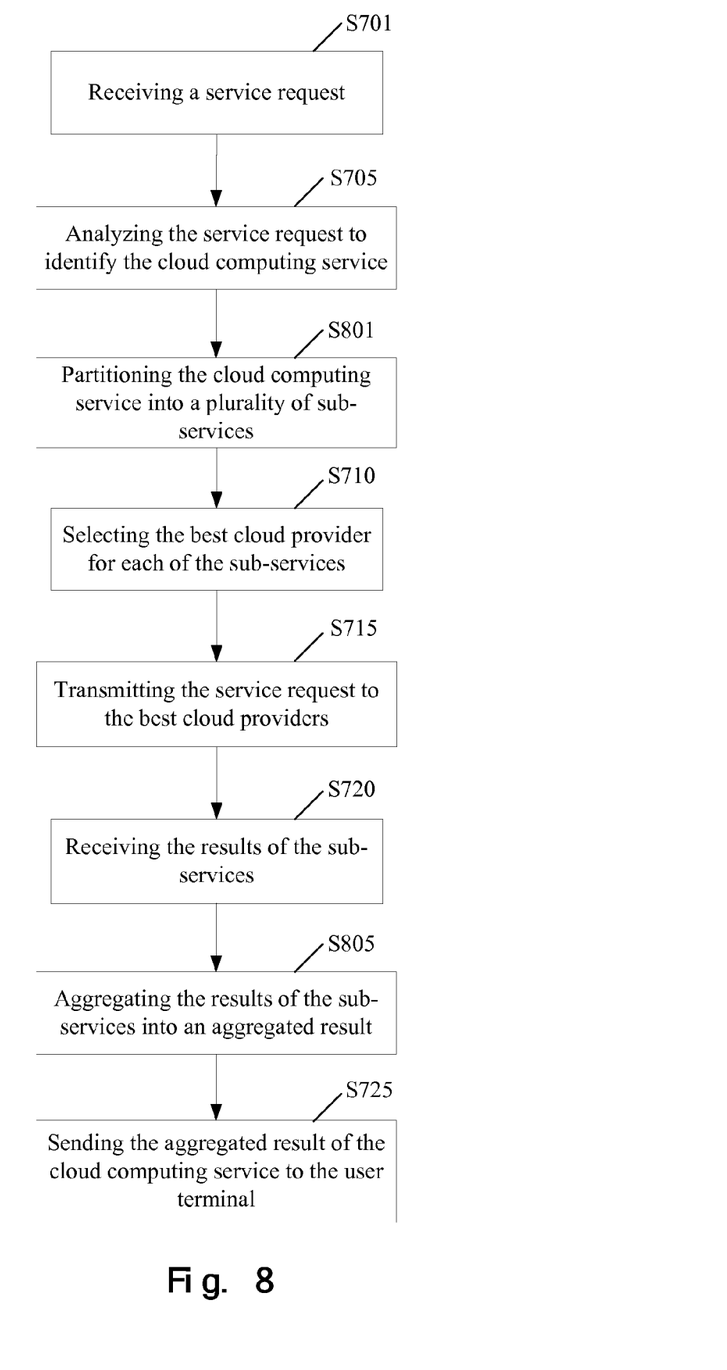
FIG. 8 is a flow chart of the method for providing a user terminal access to a cloud provider according to the second embodiment of the present invention.

FIG. 8 shows a flow chart of the method for providing a user terminal access to a cloud provider according to the second embodiment of the present invention. This embodiment will be described in detail below in conjunction with the figure, wherein for the same parts as those of the previous embodiments, the description will be properly omitted In this embodiment, as shown in FIG. 8, after the analyzing step S705, if the identified cloud computing service contains multiple types of cloud computing services, at step S801, the identified cloud computing service is partitioned into a plurality of sub-services. Then for each of the plurality of sub-services, the selecting step S710 is carried out to select the respective best cloud providers. After receiving the results of the plurality of sub-services at step S720, the received results of the plurality of sub-services are aggregated into an aggregated result of the identified cloud computing service at step S805.

It should be noted that the method for providing a user terminal access to a cloud provider of this embodiment can be carried out by the cloud computing access gateway 300 as shown in FIG. 3.

Figure 9:
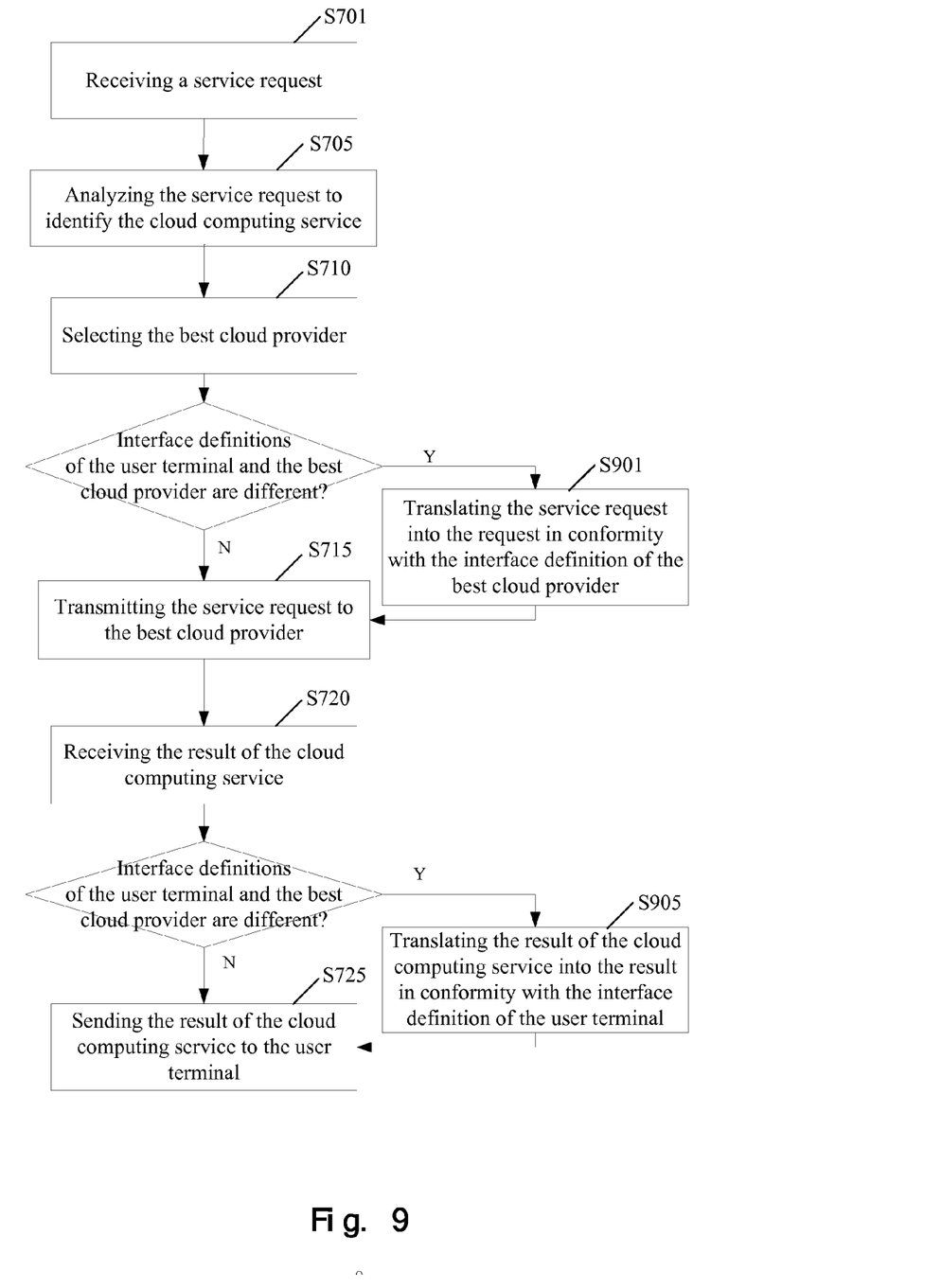
FIG. 9 is a flow chart of the method for providing a user terminal access to a cloud provider according to the third embodiment of the present invention.

FIG. 9 shows a flow chart of the method for providing a user terminal access to a cloud provider according to the third embodiment of the present invention. This embodiment will be described in detail below in conjunction with the figure, wherein for the same parts as those of the previous embodiments, the description will be properly omitted.

In this embodiment, as shown in FIG. 9, after selecting the best cloud provider at step S710, if the user terminal and the best cloud provider adopt the different interface definitions, the received service request is translated into a service request in conformity with the interface definition of the best cloud provider at step S901, and the translated service request is sent at step S715. Upon the receipt of the result of the cloud computing service at step S720, at step S905, the received result of the cloud computing service is translated into a result of the cloud computing service in conformity with the interface definition of the user terminal, and at step S725, the translated result of the cloud computing service is sent to the user terminal.

It should be noted that the method for providing a user terminal access to a cloud provider of this embodiment can be carried out by the cloud computing access gateway 500 as shown in FIG. 5.

Figure 10:
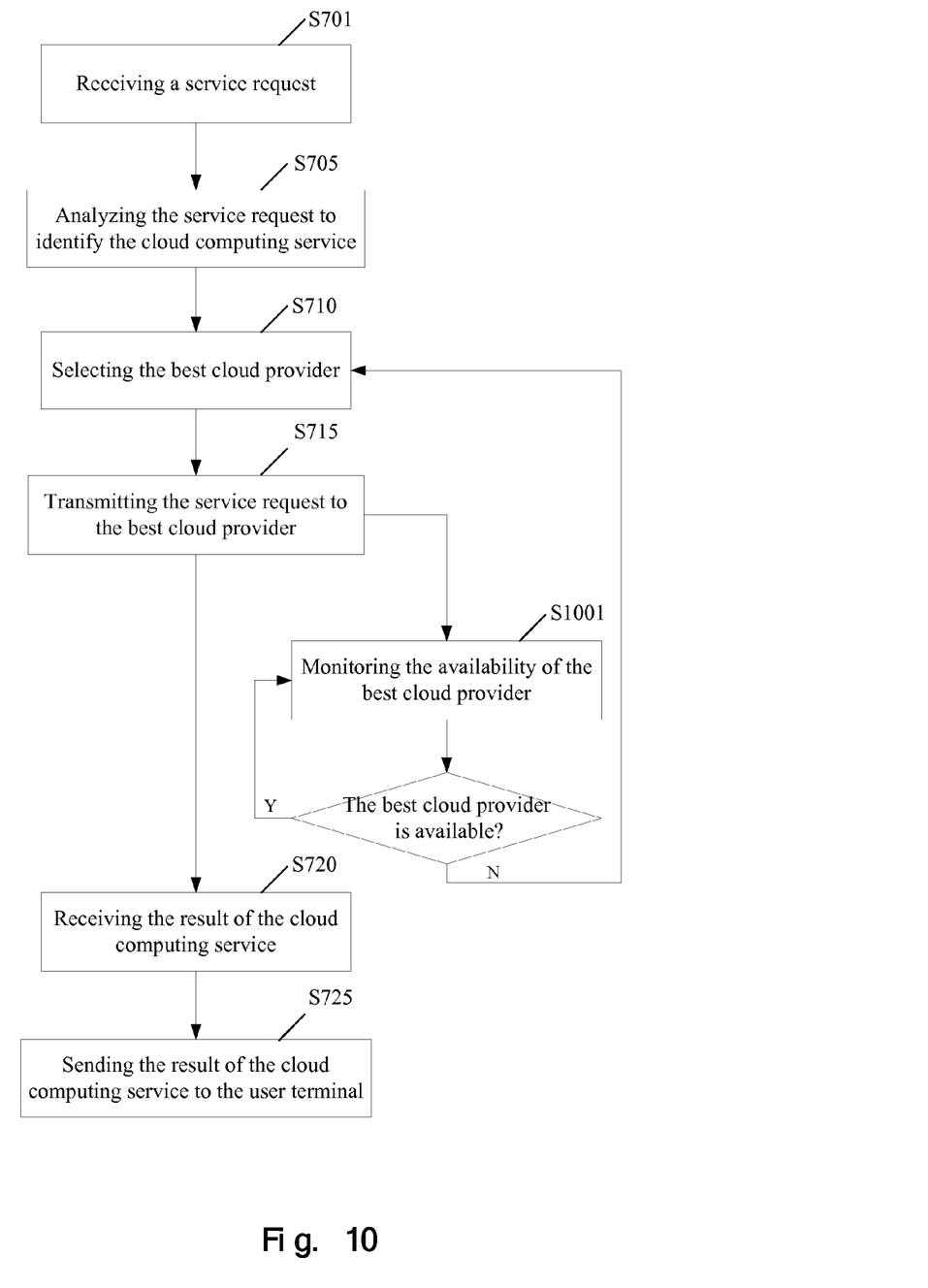
FIG. 10 is a flow chart of the method for providing a user terminal access to a cloud provider according to the fourth embodiment of the present invention.

FIG. 10 shows a flow chart of the method for providing a user terminal access to a cloud provider according to the fourth embodiment of the present invention. This embodiment will be described in detail below in conjunction with the figure, wherein for the same parts as those of the previous embodiments, the description will be properly omitted.

In this embodiment, as shown in FIG. 10, when the best cloud provider is executing the cloud computing service, the availability of the best cloud provider is monitored at step S1001. If the best cloud provider is available, the monitoring continues. If the best cloud provider is unavailable, the step S710 is performed again to select another best cloud provider.

In addition, after receiving the result of the cloud computing service from the best cloud provider, the cloud computing service of the cloud provider can be evaluated based on the response time for the service request, stability of the cloud computing service, relevance and preciseness of the result of the cloud computing service, etc., and the result of the evaluation can be stored as one of the bases for a next selection of the best cloud provider.

It should be noted that the method for providing a user terminal access to a cloud provider of this embodiment can be carried out by the cloud computing access gateway 600 as shown in FIG. 6.

A person skilled in the art can understand that the steps of the method for providing a user terminal access to a cloud provider of the above embodiments can be combined with each other arbitrarily. For example, in another embodiment, the method for providing a user terminal access to a cloud provider may comprise all the steps of the above embodiments.

Although the cloud computing access gateway and the method for providing a user terminal access to a cloud provider of the present invention have been described above through some exemplary embodiments, these embodiments are not exhaustive, a person skilled in the art can realize various changes and modifications within the spirit and scope of the present invention. Therefore, the present invention is not limited to these embodiments, and the scope of invention is only defined by the appended claims.

What is claimed is:

1. A cloud computing access gateway, comprising:
a processor configured to,
store a plurality of cloud providers and information associated with a corresponding cloud computing service provided by each of the plurality of cloud providers;
provide an interface with a user terminal;
receive a service request indicating a cloud computing service from the user terminal;
analyze the received service request to identify the cloud computing service;
search for one or more of the plurality of cloud providers whose corresponding cloud computing service matches the cloud computing service requested by the user terminal;
determine a best one of the one or more of the plurality of cloud providers based on a configuration of the cloud computing service defined by a user of the user terminal;
provide an interface with the best cloud provider;
when the user terminal and the best cloud provider adopt different interface definitions, translate the received service request into another service request in conformity with an interface definition of the best cloud provider;
transmit the service request to the best cloud provider;
receive a result of the service request from the best cloud provider,
translate the received result into another result in conformity with an interface definition of the user terminal;
send the result to the user terminal;
monitor an availability of the best one of the cloud providers; and
select a next best cloud provider from among the one or more of the plurality of cloud providers if the best one of the cloud providers is determined to be unavailable during the monitoring.

2. The cloud computing access gateway according to claim 1, wherein the information includes a unique resource identifier, an interface definition, a service type, quality of service and a cost associated with the corresponding cloud computing service provided by each of the plurality of cloud providers.

3. The cloud computing access gateway according to claim 1, wherein the processor is further configured to permit the user of the user terminal to define the configuration of the cloud computing service.

4. The cloud computing access gateway according to claim 3, wherein the processor is further configured to permit the user of the user terminal to define a shortcut key for the cloud computing service.

5. The cloud computing access gateway according to claim 1, wherein the processor is further configured to provide the one or more of the plurality of cloud providers to the user terminal to allow the user of the user terminal to select the best cloud provider.

6. The cloud computing access gateway according to claim 1, wherein the processor is further configured to
partition the cloud computing service of the service request into a plurality of sub-services;
aggregate results of the plurality of sub-services into the result of the service request; and
determine a best cloud provider for each of the plurality of sub-services.

7. The cloud computing access gateway according to claim 1, wherein the configuration of the cloud computing service includes at least one of a desired quality of service, a desired cost and a desired security level for the cloud computing service requested in the service request.

8. A method for providing a user terminal access to a cloud provider, comprising:
receiving a service request from the user terminal, the service request indicating a cloud computing service;
analyzing the service request to identify the cloud computing service;
searching for one or more of a plurality of cloud providers whose corresponding cloud computing service matches the cloud computing service requested by the user terminal;
determining a best one of the one or more of the plurality of cloud providers based on a configuration of the cloud computing service defined by a user of the user terminal;
when the user terminal and the best cloud provider adopt different interface definitions, translating the received service request into another service request in conformity with an interface definition of the best cloud provider;
transmitting the service request to the best cloud provider;
receiving a result of the service request from the best cloud provider;
translating the received result into another result in conformity with an interface definition of the user terminal;
sending the result to the user terminal;
monitoring an availability of the best one of the cloud providers; and
selecting a next best cloud provider from among the one or more of the plurality of cloud providers if the best one of the cloud providers is determined to be unavailable during the monitoring.

9. The method according to claim 8, wherein, the determining includes providing the user terminal with the searched one or more of the plurality of cloud providers to allow the user of the user terminal to select the best cloud provider.

10. The method according to claim 8, further comprising:
partitioning the cloud computing service into a plurality of sub-services, upon analyzing the service request;
performing the searching and the selecting for each of the plurality of sub-services to select a respective best cloud provider for each of the plurality of sub-services; and
upon receiving results of the plurality of sub-services, aggregating the results of the plurality of sub-services into the result of the service request.

* * * * *